(12) United States Patent
Yokochi (10) Patent No.: US 6,527,174 B2
(45) Date of Patent: Mar. 4, 2003

(54) CARD PAYMENT TRANSACTION TERMINAL AND CARD PAYMENT TRANSACTION SYSTEM

(75) Inventor: Akihiko Yokochi, Kanagawa-ken (JP)

(73) Assignee: Toshiba Tec Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/801,771

(22) Filed: Mar. 9, 2001

(65) Prior Publication Data

US 2001/0020640 A1 Sep. 13, 2001

(30) Foreign Application Priority Data

Mar. 10, 2000 (JP) .......................................... 2000-066586

(51) Int. Cl.[7] ................................................. G06K 5/00
(52) U.S. Cl. ........................................ 235/380; 235/382
(58) Field of Search .................................. 235/380, 379, 235/381, 382; 902/1, 4, 5, 25, 31; 705/35, 39, 41, 43

(56) References Cited

U.S. PATENT DOCUMENTS

| 3,710,105 | A | * | 1/1973 | Oxendine, Jr. et al. ...... 235/380 |
| 4,701,601 | A | * | 10/1987 | Francini et al. ............. 235/449 |
| 5,192,855 | A | * | 3/1993 | Insulander et al. ......... 235/381 |
| 5,319,362 | A | * | 6/1994 | Hyatt, Jr. ................. 235/382.5 |
| 5,386,104 | A | * | 1/1995 | Sine .......................... 235/379 |
| 5,445,295 | A | * | 8/1995 | Brown ....................... 235/381 |
| 5,734,150 | A | * | 3/1998 | Brown et al. ............... 235/381 |
| 6,044,382 | A | * | 3/2000 | Martino ..................... 705/505 |

FOREIGN PATENT DOCUMENTS

| JP | 11-231790 | 8/1999 |
| JP | 11-282752 | 10/1999 |

* cited by examiner

*Primary Examiner*—Daniel St. Cyr
(74) *Attorney, Agent, or Firm*—Oblon, Spivak, McClelland, Maier & Neustadt, P.C.

(57) ABSTRACT

A system which can prevent a forged card from being used and can find a person who has done an illegal act of installing a skimmer, by using transmission information sent from a card payment transaction terminal. When the opening of the terminal body has been detected, the card payment transaction terminal stores information of an illegal act that has been performed in a memory, and transmits transmission information including that information to an external computer. When the external computer has received card information from the card payment transaction terminal after having stored the received transmission information in a transmission information table, the external computer stores the card information in a handled card information table in relation to the stored transmission information. Further, in a case where the external computer has received an inquiry about card payment transaction information including the card information same as a stored handled card information, an inquired card payment transaction is permitted when the number of times of the inquiry is equal to or less than a preset number of times, and the inquired card payment transaction is rejected when the number of times of the inquiry exceeds the preset number of times.

7 Claims, 9 Drawing Sheets

BACKGROUND ART

FIG. 9   BACKGROUND ART

CARD PAYMENT TRANSACTION TERMINAL AND CARD PAYMENT TRANSACTION SYSTEM

BACKGROUND OF THE INVENTION

1. Field of the Invention

The present invention relates to a card payment transaction terminal and system which are so formed that a card payment transaction can be executed by using card information read from an inserted card and a password inputted.

2. Description of the Related Art

Figure 7:
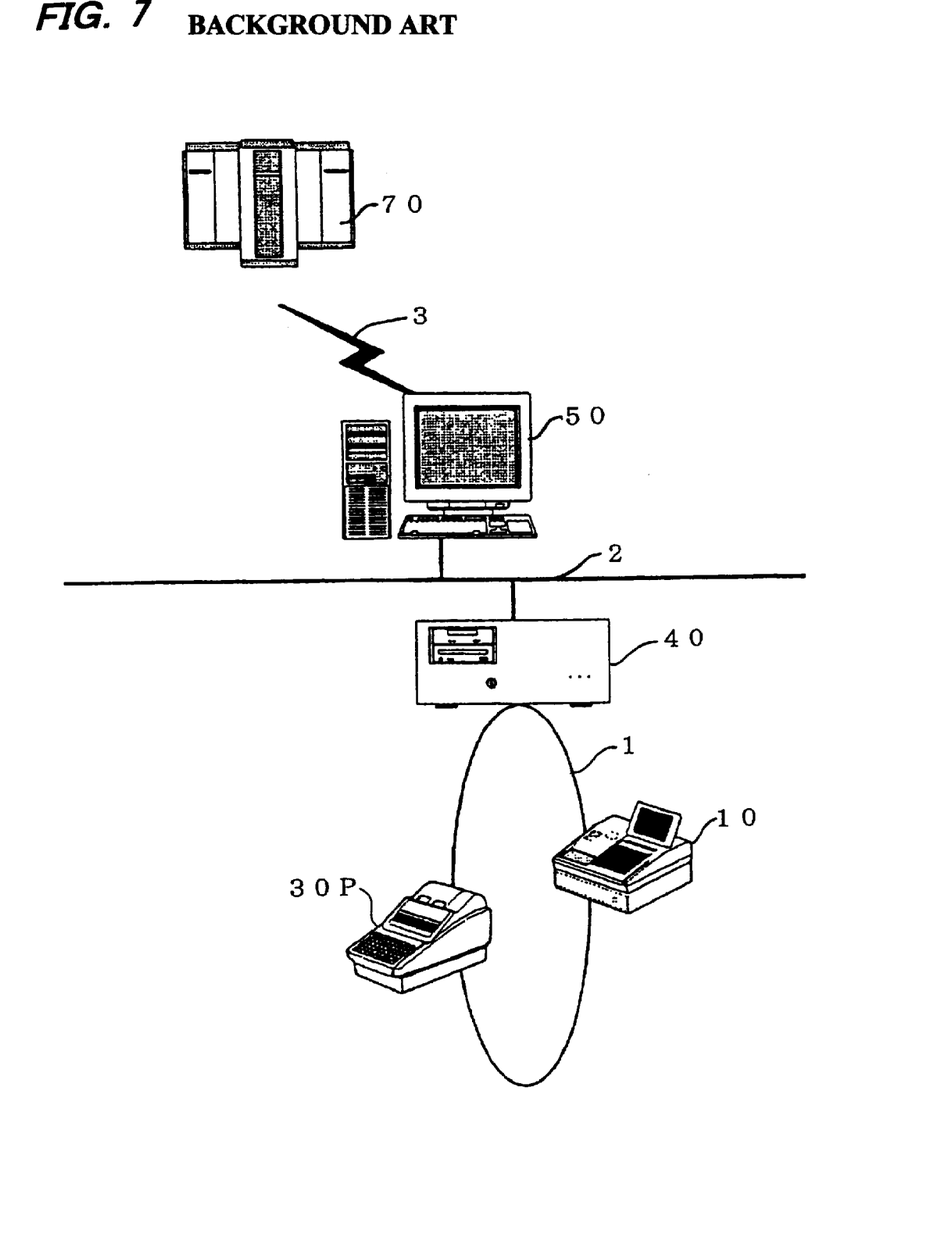
FIG. 7 is a system architecture view for explaining the present invention and a prior-art example.

Referring to FIG. 7, goods sales data processing unit (POS system) is disposed in, for example, a supermarket or a large-sized domestic electrical appliance store. The unit is so constructed that a plurality of electronic cash registers 10 and a POS controller 40 are connected through a data communication line 1, and that they and a store controller 50 being a host machine are connected through a data communication line (for example, LAN) 2.

The individual electronic cash registers 10 can execute goods registrations for goods purchased by customers, and account transactions for the registered goods. Sales data are gathered by the store controller 50, and are collectively managed therein.

The account transactions by the electronic cash register 10 include card payment as well as payment in cash. In order to deal with the card payment, card payment transaction terminals 30P are provided in a number equal to or smaller than the number of the electronic cash registers 10.

Figure 8:
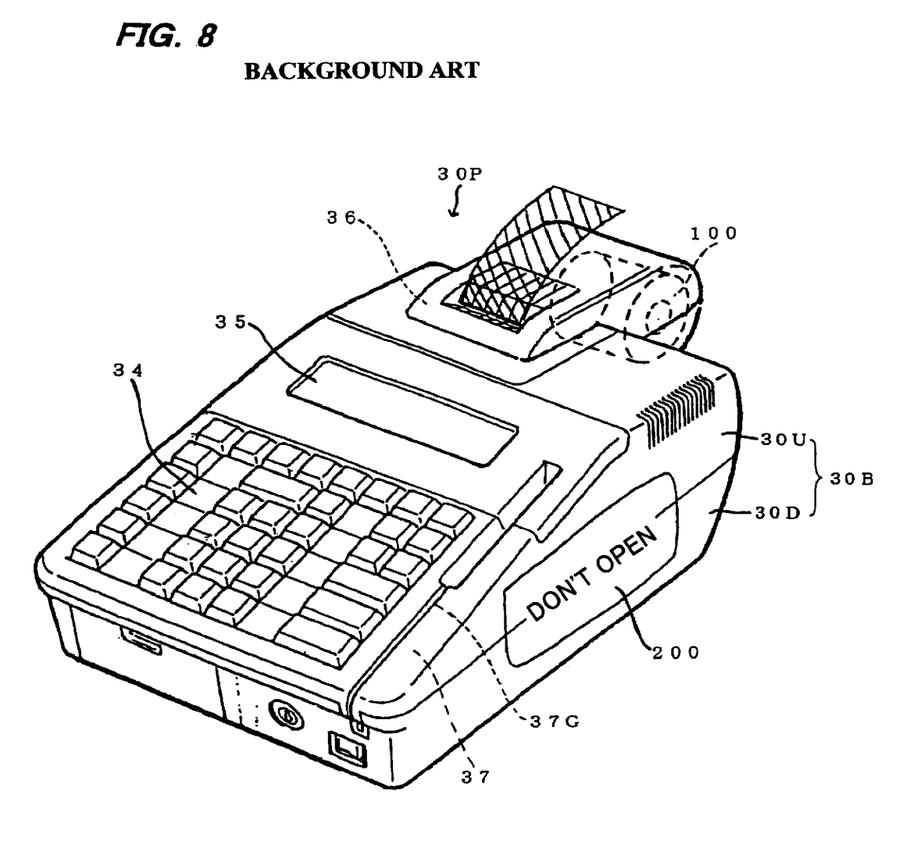
FIG. 8 is an exterior perspective view for explaining a card payment transaction terminal in the prior art.

The card payment transaction terminal 30P is a terminal for making an inquiry as to credit. As shown in FIG. 8, the terminal body 30B is formed as a structure in which an upper housing 30U and a lower housing 30D are combined. Besides, the terminal body 30B is constructed including a control unit (a CPU, a ROM, etc.), a data input device 34, a data display device 35, a card reader 37 and a printer 36.

Now, the basic functions of the card payment transaction terminal 30P will be explained with reference to FIG. 9.

First, when a card user or a store clerk inserts a card into the card reader 37 through an insertion guide 37G (YES at ST50 in FIG. 9), the card reader 37 reads card information including the personal data of the card (ST51).

Subsequently, the card user himself/herself inputs his/her personal ID (password) with the data input device 34 (YES at ST52). Further, the card user or the clerk inputs payment information (such as the amount of payment) (YES at ST53). The amount of payment, etc. are displayed on the data display device 35 for the sake of verification.

Besides, the card payment transaction terminal 30P generates inquiry information (ST54), and it inquires of the POS controller 40 through the data communication line 1 shown in FIG. 7. Further, the POS controller 40 inquires of the store controller 50 through the data communication line 2. Finally, the store controller 50 inquires of a host computer (external computer) 70 installed in, e. g., a credit card company, about the card through a data communication line 3 (ST55).

Besides, when the card payment transaction terminal 30P receives an permission response from the external computer 70 (YES at ST56,. YES at ST57), it executes a card payment transaction (ST58). Card payment data are printed on printing paper delivered from a roll of printing paper 100, by the printer 36. The printed paper is handed to the card user. By the way, when the card payment transaction terminal 30P receives a rejection response (YES at ST56, NO at ST57), it executes an error transaction (ST59).

Accordingly, the card payment transaction terminal 30P can execute the complicated card payment quickly and exactly, and such transaction terminals have remarkably spread wide.

With the spread of the terminals, however, the damages of so-called "skimming" being illegal acts in which wrongdoers copy the personal data of cards have become a serious problem.

More specifically, someone (the wrongdoer) having stolen in at midnight will detach the upper housing 30U and lower housing 30D constituting the terminal body 30B, then mount a so-called "skimmer", which is a device having a size approximately equal to that of a cigarette case and capable of copying the personal data, near the card reader 37 built in the terminal body 30B, and thereafter reassemble the terminal body 30B.

When a clerk not knowing the wrongdoing inserts cards into the card reader 37 and makes inquiries on and after the next day (ST51 to ST54 in FIG. 9), the personal data of the cards are accumulated into the skimmer simultaneously with the inquiries. That is, the skimming is done at each well-intentioned use after the mounting of the skimmer.

Thereafter, the wrongdoer will disassemble the terminal body 30B, take out the skimmer and read the personal data copied by the skimmer. Then, a plurality of cards might be forged by the wrongdoer so as to be used illegally. Since the holders of the lawful cards do not notice their damages soon, the skimming is serious.

Meanwhile, in a case where the terminal body 30B is disassembled and reassembled, it is inevitably opened. Therefore, a sealing label 200 on which words "DON'T OPEN" are printed as shown in FIG. 8 is stuck on the terminal body 30B in order that the clerk et al. may judge the opening of the terminal body 30B, that is, the high likelihood of the mounting of the skimmer.

When the terminal body 30B was disassembled (or opened), the clerk et al. can know the illegal act from the external appearance of the terminal body 30B. In this way, the store side has prevented the skimming from occurring.

However, the methods of illegal acts become craftier and craftier. By way of example, when a substitute label for the sealing label 200 is created and stuck, the store side cannot find out the illegal act. The illegal act in which an insider is involved cannot be seen through at all for the reason that a genuine label is stuck as the sealing label 200.

In this regard, there has been proposed and has come into use a card payment transaction terminal which is so constructed that the opening of the terminal body 30B can be electronically detected, and that, in case of the detection, a card payment transaction program, for example, can be forcibly destroyed by judging the mounting of the skimmer.

By the way, in each of an eating house, a golf course, a gasoline station, etc., the card payment transaction terminal 30P is sometimes used independently out of relation to the electronic cash register 10.

With the program destruction scheme, certainly the skimming and the card forgery can be prevented, but card payment transactions for customers in good faith cannot be handled after the illegal act at which the skimmer was mounted. That is, customer service degrades with the scheme. Besides, the scheme really avoids actual damage to the store or the like because of the prevention of the skimming as well as the card forgery, but it has the fatal problem of failing to take the drastic measure of finding and arresting the wrongdoer and his/her group who mounted the skimmer.

SUMMARY OF THE INVENTION

The first objective of the present invention is to provide a card payment transaction terminal which can externally transmit information to the effect that the illegal act of mounting a skimmer was performed. The second objective is to provide a system which can prevent the use of a forged card from occurring and can find a wrongdoer having mounted a skimmer, by using transmission information sent from a card payment transaction terminal.

(1) A card payment transaction terminal of one aspect of the present invention executes a card payment transaction by using card information read from an inserted card and a password inputted to the terminal, wherein the terminal detects that a terminal body has been opened when the terminal body is opened, and information of an illegal act that has been performed is stored in a memory when the opening of the terminal body is detected, and wherein transmission information that includes information stored in the memory is transmitted to an external device.

With such a card payment transaction terminal, when the opening of the terminal body has been detected, the performance of the illegal act is judged, and the information to that effect is stored in the memory. Besides, the terminal transmits the transmission information including the information stored in the memory, to the exterior (for example, a card issuing company or a card administering company).

Accordingly, the card payment transaction terminal can execute the card payment transactions of customers in good faith even after the mounting of a skimmer unlike the program destruction mode in the prior art. Therefore, the terminal can keep customer service, and it permits the exterior to know that the illegal act of mounting the skimmer was performed. Also, the terminal facilitates to take the drastic measure of finding and arresting a wrongdoer and his/her group who mounted the skimmer.

(2) The information of the illegal act may be stored as time information including at least one of a date and a time that is abnormal.

With such a card payment transaction terminal, since the information of the illegal act is stored as the time information including the date or time which cannot exist ordinarily, it is possible to easily execute the card payment transactions of customers in good faith, and to reliably discriminate whether or not a card is a forged one, in the exterior, even after the transmission information to the effect of the performance of the illegal act was transmitted to the exterior. Also, with the terminal, it is not noticed by the wrongdoer that the information was transmitted, and the wrongful alteration of the information, etc. by the wrongdoer can be prevented.

(3) The time information may be generated by modifying a standard time of a clock included in the terminal body.

With such a card payment transaction terminal, since the time information which is the information of the illegal act is generated by modifying the standard time of the clock in the terminal body, the wrongdoer cannot meddle with the terminal. Therefore, the terminal can reliably prevent the skimming and is safer.

(4) The clock may return to the standard time when a security card has been installed in a predetermined position within the terminal body.

With such a card payment transaction terminal, the modified time of the clock in the terminal body can be returned to the standard time when the security card has been installed in the predetermined position within the terminal body. Accordingly, the security card can be kept in custody only in, e. g., the factory of the manufacturer of the terminal, so that the terminal is much safer.

(5) The card payment transaction terminal may further comprise a sensor which detects that the terminal body has been opened.

(6) The memory may be a nonvolatile memory.

Information stored in the memory can be transmitted even after the reassembly of the terminal body. Accordingly, the terminal can transmit the information to the effect of the performance of illegal acts, to the exterior anytime and repeatedly.

(7) A card payment transaction system of a second aspect of the present invention transmits to an external computer, information of card payment transaction using card information read from an inserted card by a card payment transaction terminal and a password inputted to the terminal, and executes a card payment transaction after a permission of the external computer has been obtained, wherein the card payment transaction terminal is formed so that:

the terminal detects that a terminal body has been opened when the terminal body is opened, and information of an illegal act that has been performed is stored in a memory when the opening of the terminal body is detected; and transmission information that includes information stored in the memory is transmitted to an external device, and wherein the external computer is formed so that:

the transmission information received from the card payment transaction terminal is stored in a transmission information table, and thereafter the card information which relates to the card payment transaction information received from the card payment transaction terminal is stored in a handled card information table in relation to the transmission information stored in the transmission information table; and in a case where an inquiry about the card payment transaction information which includes the card information that is same as a handled card information stored in the handled card information table has been received from the card payment transaction terminal, an inquired card payment transaction is permitted when the number of times of the inquiry is equal to or less than a preset number of times, and the inquired card payment transaction is rejected when the number of times of the inquiry exceeds the preset number of times.

With such a card payment transaction system, when the opening of the terminal body has been detected, the card payment transaction terminal judges the likelihood of the mounting of a skimmer and stores the information of the illegal act in the memory. Besides, the terminal transmits the transmission information including the information stored in the memory, to the external computer. Thus, the transmission of the terminal is not noticed even in a case where the insider of a store for which the system is installed coexists as one member of the group of wrongdoers.

Besides, upon receiving the transmission information from the card payment transaction terminal, the external computer stores this transmission information in the transmission information table. In the case where the external computer has received the card payment transaction information from the card payment transaction terminal after having stored the transmission information, it stores the card information concerning the received card payment transaction information, in the handled card information table in relation to the transmission information stored in the transmission information table.

In the case where the external computer has received from the card payment transaction terminal, the inquiry about the card payment transaction information which includes the same card information as the handled card information stored in the handled card information table, it permits the card payment transaction when the number of times of inquiries is equal to or smaller than the preset number of times, and it rejects the card payment transaction when the number of times of inquiries exceeds the preset number of times.

Accordingly, the system can prevent the use of a forged card from occurring and can find a wrongdoer having mounted a skimmer, by using the transmission information sent from the card payment transaction terminal. More specifically, the system can execute the card payment transactions of customers in good faith even after the mounting of the skimmer unlike the program destruction mode in the prior art, so that it can keep customer service. Besides, the system permits the external computer side to know that the illegal act of mounting of the skimmer was performed. Also, the system is easy of taking the drastic measure of finding and arresting the wrongdoer and his/her group who mounted the skimmer. Moreover, according to the system, when the preset number of times is set at "one time" by way of example, only one time of card use by a customer in good faith is permitted after the mounting of the skimmer, and the uses of the same card at the second time, et seq. can be readily discriminated as the illegal uses of the forged card. Further, when the preset number of times is set at "3 times" by way of example, the system can be operated so as to permit 3 times of card uses in good faith a day for a regular customer, and the applicability thereof can be expanded more.

Incidentally, as an aspect concerning the detection of the opening of the card payment transaction terminal body, in a case where the terminal body is constructed by combining the two housings of an upper housing and a lower housing by way of example, the card payment transaction system of the present invention may well be formed so as to be capable of detecting it as the opening of the terminal body that the wrongdoer disassembled the terminal body into the upper housing and the lower housing.

(8) The external computer may output the handled card information stored in the handled card information table.

With such a card payment transaction system, since the external computer can output the handled card information stored in the handled card information table (as, for example, a display output or/and a print output), the deduction of the forged card is facilitated.

(9) The external computer may output the transmission information stored in the transmission information table.

With such a card payment transaction system, since the external computer can output the transmission information stored in the transmission information table (as, for example, a display output or/and a print output), the likelihood of the use of the forged card can be supposed before the illegal use thereof.

(10) The memory of the card payment transaction terminal, and the transmission information table and the handled card information table of the external computer may be nonvolatile memories.

With such a card payment transaction system, since the information stored in the memory of the card payment transaction terminal can be transmitted even after the reassembly of the terminal body, the terminal can transmit the information to the effect of the performance of illegal acts, to the exterior anytime or repeatedly. Further, the external computer can accept the transmission information anytime or repeatedly. Accordingly, the system can sense the illegal use of the forged card.

DESCRIPTION OF THE PREFERRED EMBODIMENTS

Now, an aspect of performance of the present invention will be described with reference to the drawings.

Figure 1:
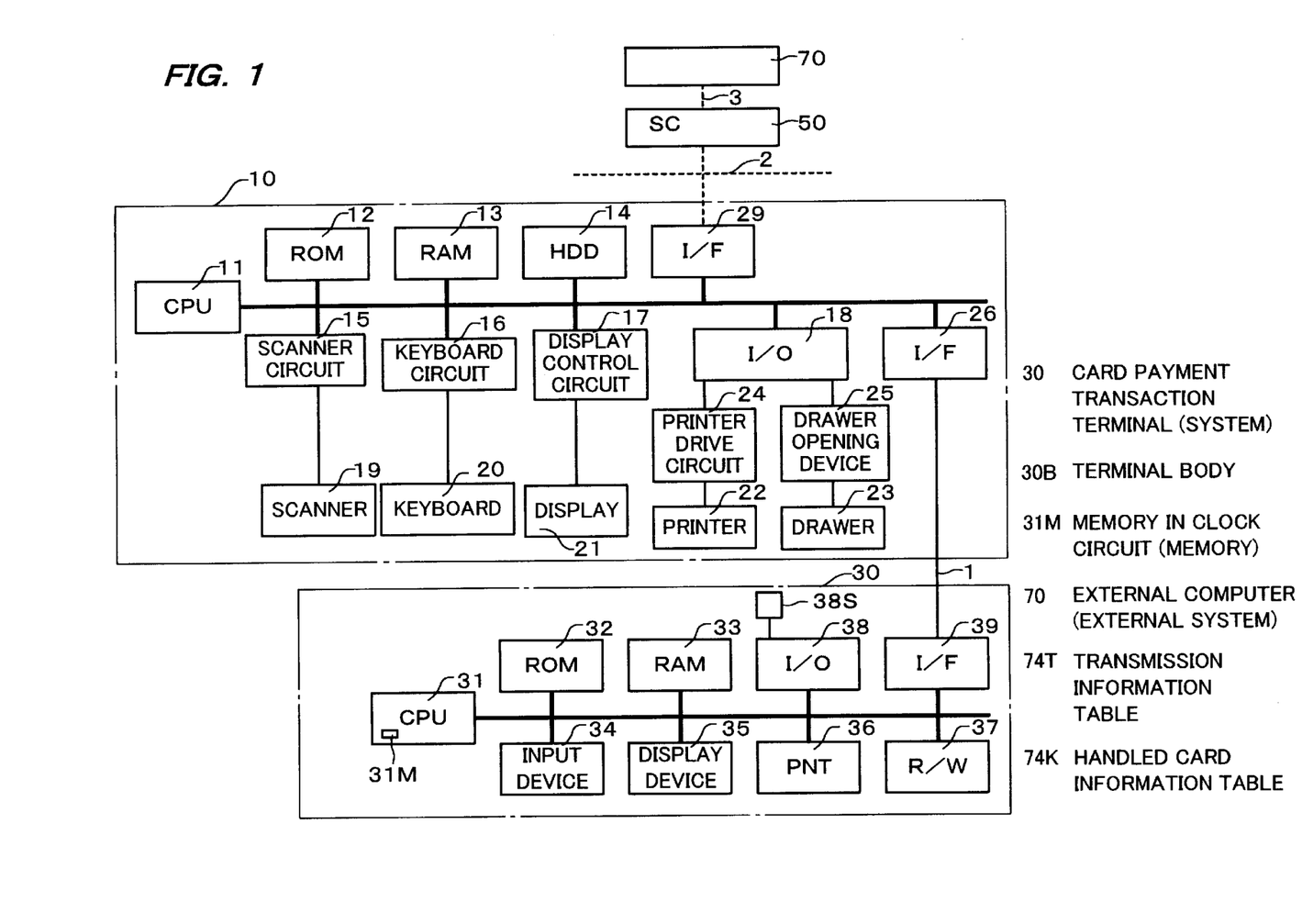
FIG. 1 is a block diagram of a system showing an aspect of performance of the present invention.
Figure 2:
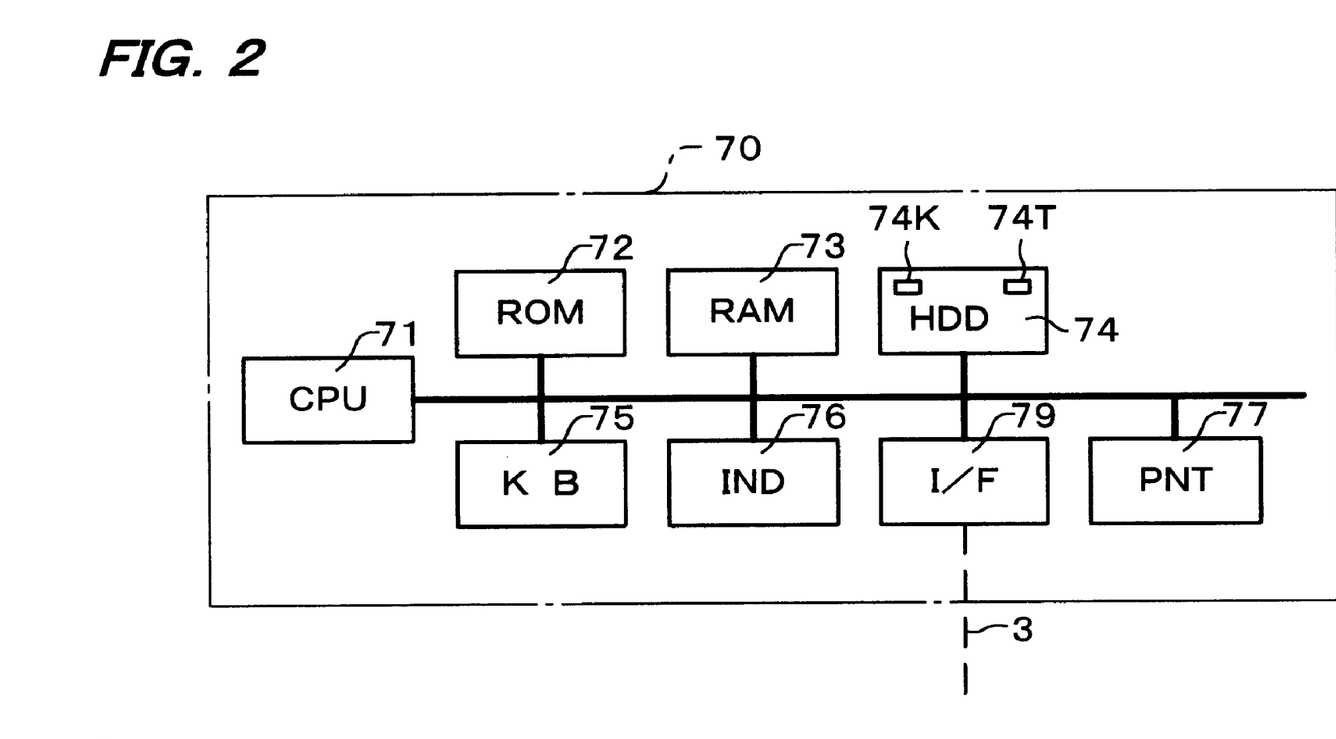
FIG. 2 is a block diagram for explaining the configuration of an external computer in the present invention.
Figure 3:
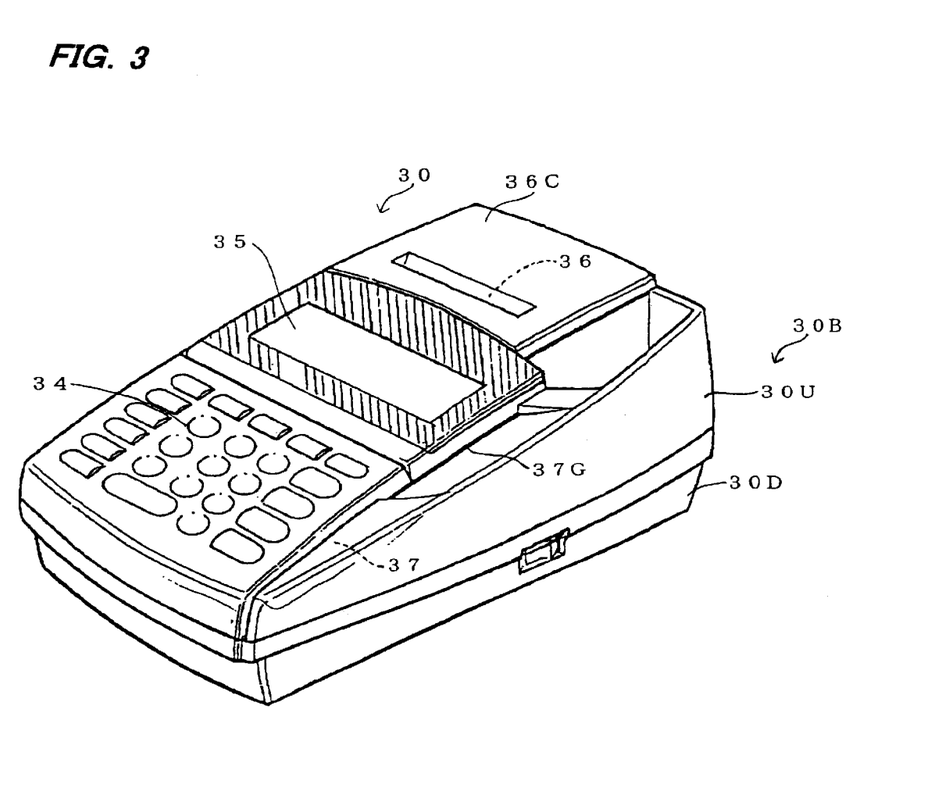
FIG. 3 is an exterior perspective view of a card payment transaction terminal in the present invention.
Figure 4:
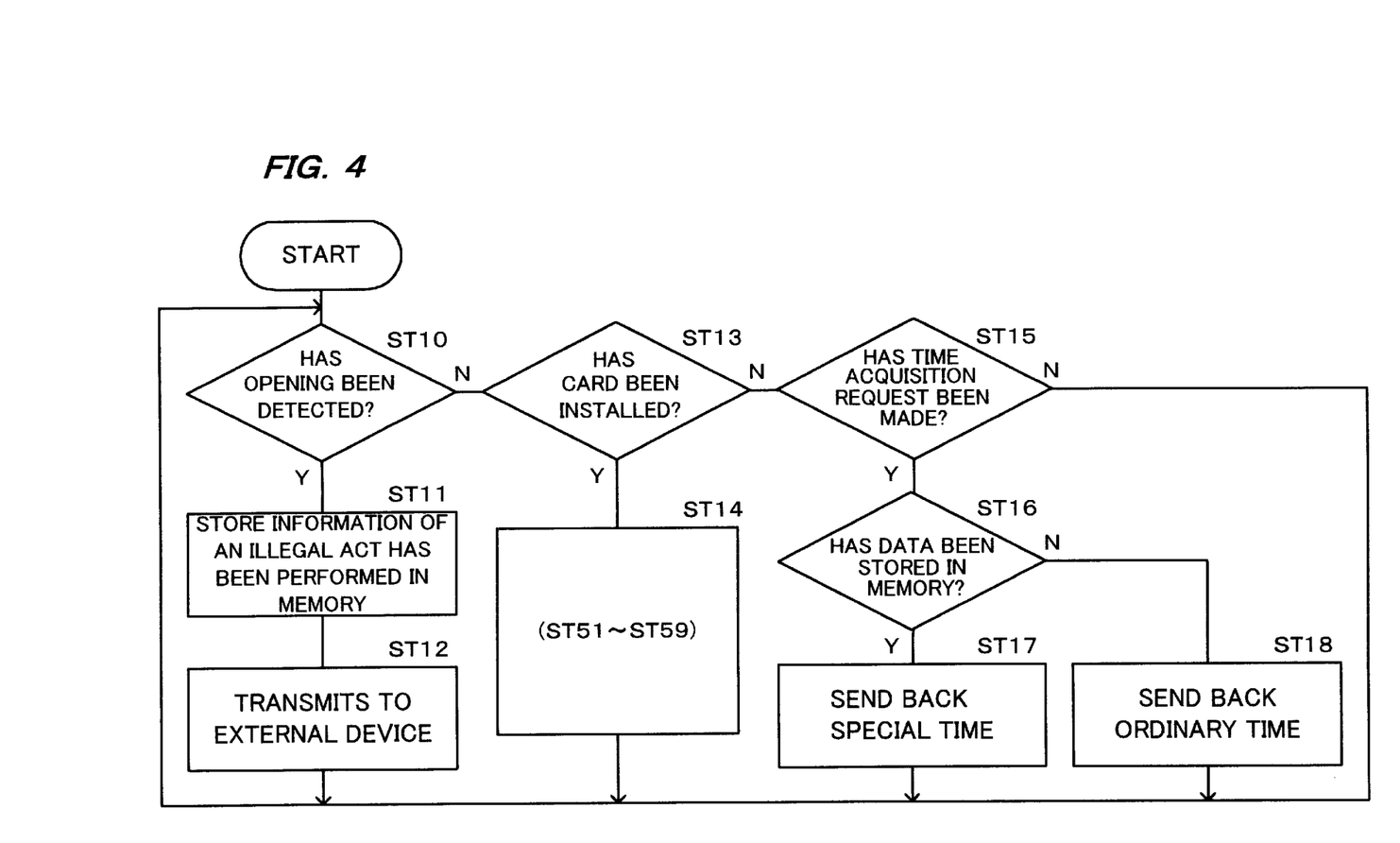
FIG. 4 is a flow chart for explaining the operation of a card payment transaction terminal side in the present invention.
Figure 5:
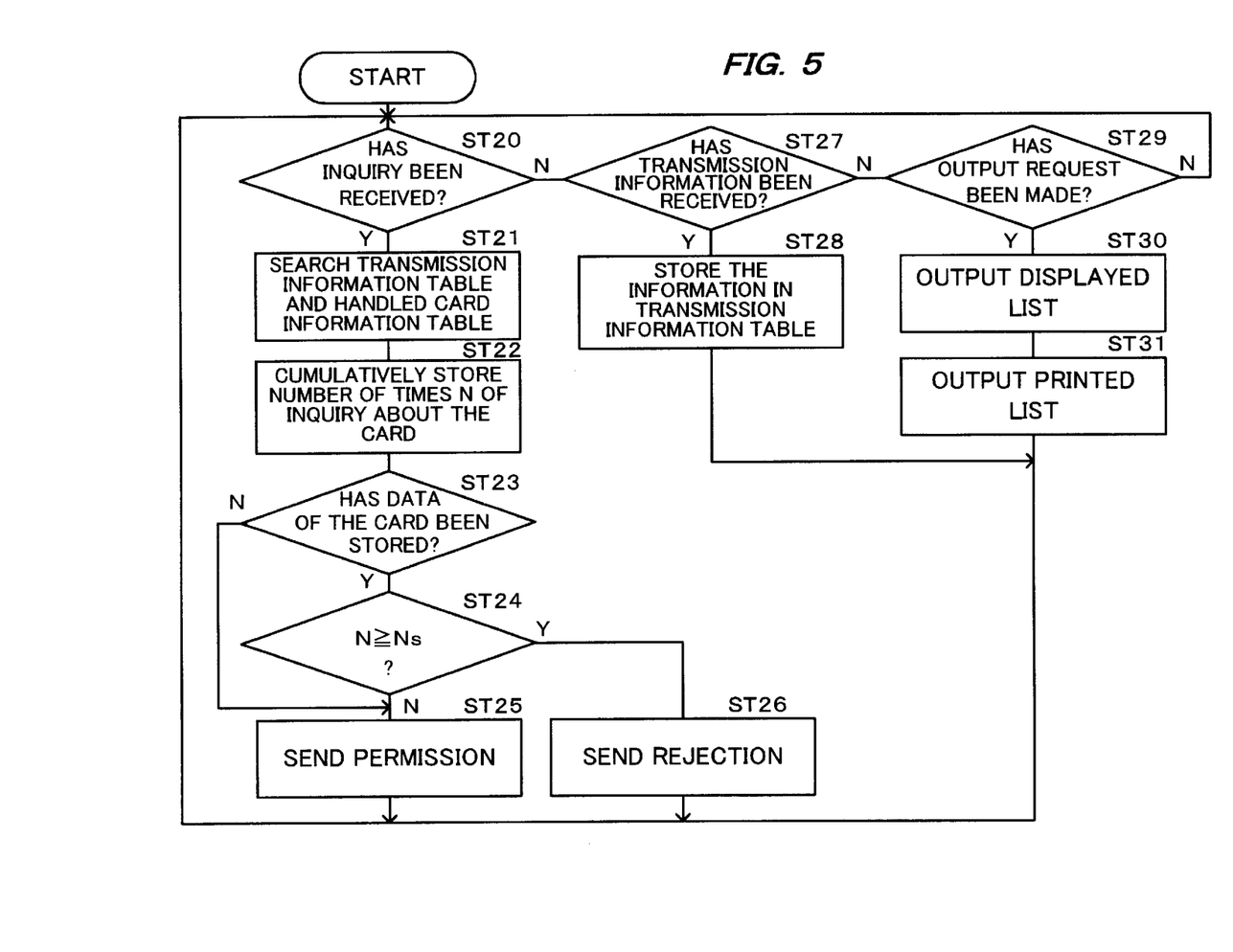
FIG. 5 is a flow chart for explaining the operation of an external computer side in the present invention.
Figure 6:
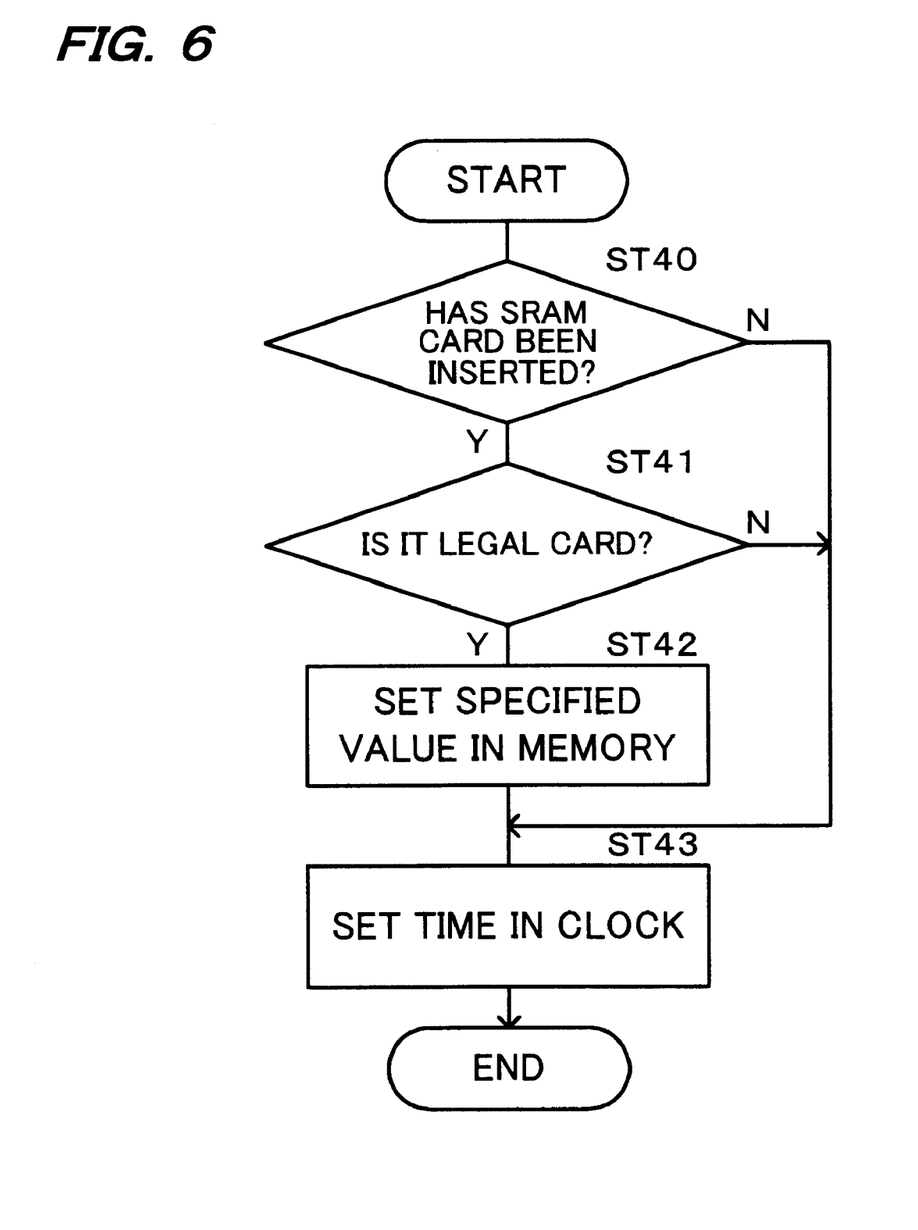
FIG. 6 is a flow chart for explaining the initializing operation of the card payment transaction terminal side in the present invention.

A system (30, 70) having the card payment transaction terminal 30 according to the present invention is similar to the prior-art example (FIGS. 7 to 9) in the basic architecture and functions. Besides, the practicable architecture of the system is shown in FIGS. 1 to 3. Further, the practicable functions of the system are shown in FIGS. 4 to 6.

The card payment transaction terminal 30 of the system is so formed that, when the opening of the terminal body 30B has been detected, transmission information including information to the effect of the performance of an illegal act as stored in a memory (31M) can be transmitted to the external computer 70. Herein, the external computer 70 of the system is so formed that, after the transmission information received from the card payment transaction terminal 30 is stored in a transmission information table 74T, card information concerning card payment transaction information received from the card payment transaction terminal 30 can be stored in a handled card information table 74K in relation to the transmission information stored in the transmission information table 74T. Besides, the external computer 70 of the system is so formed that, upon receiving an inquiry about card payment transaction information which includes the same card information as the handled card information stored in the handled card information table 74K, it can permit a card payment transaction when the number of times N of inquiries is equal to or smaller than a preset number of times Ns, whereas it can reject the card payment transaction when the preset number of times Ns is exceeded.

Referring to FIG. 1, an electronic cash register 10 is constructed including a CPU 11, a ROM 12, a RAM 13, an HDD (hard disk drive) 14, a scanner 19 (scanner circuit 15), a keyboard 20 (keyboard circuit 16), a display device 21 (display control circuit 17), a printer 22 (printer drive circuit 24) and a drawer 23 (drawer opener 25) which are connected through an input/output port (I/O) 18, communicating interfaces (I/F) 26, 29, and so forth. Thus, the electronic cash register 10 can execute goods registrations, account transactions, etc.

The card payment transaction terminal 30 is constructed including a CPU 31, a ROM 32, a RAM 33, a data input device 34, a data display device 35, a printer 36, a card reader (having also a writer function) 37, an input/output port (I/O) 38, a communicating interface (I/F) 39, and so forth. Thus, the card payment transaction terminal 30 can execute a selected card payment transaction (YES at ST13 in FIG. 4, and ST14 for which refer to ST51 to ST59 in FIG. 9) in the account transactions using the electronic cash register 10.

As shown in FIG. 3, the card payment transaction terminal 30 is so constructed that the terminal body 30B has an upper housing 30U and a lower housing 30D fixed unitarily. Besides, a roll of printing paper (100), a paper feeder and the printer 36 which are included in the card payment transaction terminal 30 are accommodated under an openable printer cover 36C unlike in the case of the prior-art example (FIG. 8). Such a construction can attain a smaller size and a lighter weight.

Moreover, in a case where the card payment transaction terminal 30 was opened (that is, where the upper housing 30U and the lower housing 30D were detached), the opening can be detected (YES at ST10 in FIG. 4) by an opening sensor 38S shown in FIG. 1. The control unit (CPU31, ROM32) accepts detection information through the input/output port 38.

By the way, as indicated by a phantom line in FIG. 3, the card reader 37 is mounted in an enclosed state near the data input device 34 inside the terminal body 30B (lower housing 30D) A card can be inserted into the card reader 37 within the terminal body 30B, through a card insertion guide 37G.

As shown in FIG. 2, the external computer 70 is a host computer which includes a CPU 71, a ROM 72, a RAM 73, an HDD 74, a keyboard 75, an indicator 76, a printer 77, a communicating interface (I/F) 79, and so forth, and which is installed in a credit card company or the like. Thus, upon receiving an inquiry from the card payment transaction terminal 30, the external computer 70 responds to and deals with the card payment transaction.

Figure 9:
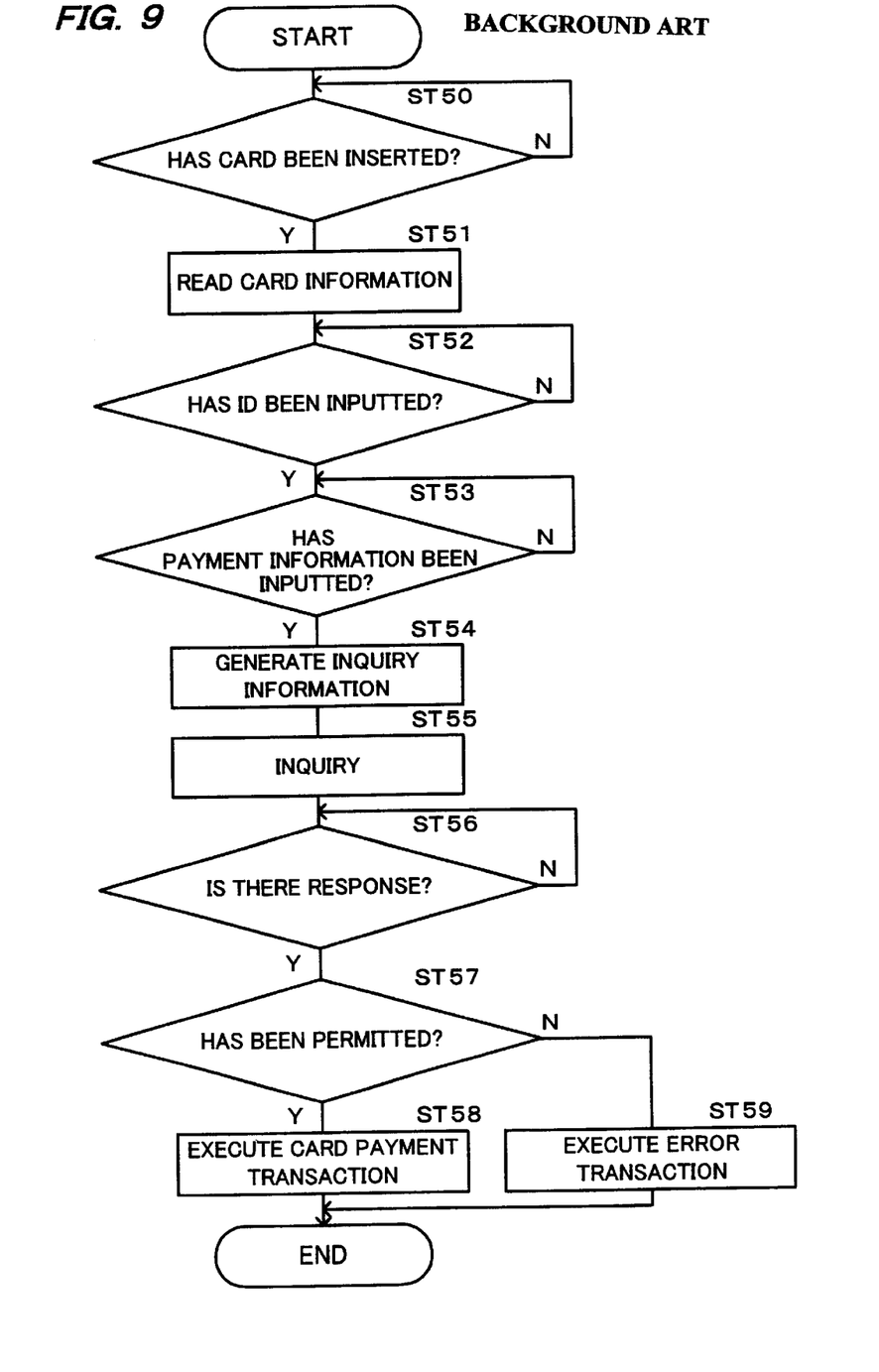
FIG. 9 is a flow chart for explaining the operation of a card payment transaction terminal side in the prior-art example.

Meanwhile, the basic functions of the card payment transaction terminal 30 are the same (YES at ST13, and ST14 in FIG. 4) as in the case of the prior-art example (ST51 to ST59 in FIG. 9).

By way of example, when a wrongdoer having intruded in the nighttime disassembles the terminal body 30B in order to mount a skimmer, the opening sensor 38s shown in FIG. 1 detects (YES at ST10 in FIG. 4) that the terminal body 30B was opened (namely, that the upper housing 30U and the lower housing 30D were detached).

Then, the storage control means (CPU 31, ROM 32) judges that the skimmer was mounted (namely, that an illegal act that has been performed). Besides, the storage control means stores (ST11) information to that effect in the nonvolatile memory 31M.

Further, the external information control means (CPU 31, ROM 32) transmits (notifies) (ST12) the information stored in the memory 31M, to the exterior (the external computer 70).

The information of the illegal act is time information including a date and time which cannot exist ordinarily (for example, 1500.15.35). In this aspect of performance, the time information is generated by modifying the standard time (for example, 2000.04.14) of a clock which is included in the terminal body 30B.

Besides, in a case where a time acquisition request has been made (YES at ST15 in FIG. 4) regarding the card payment transaction (YES at ST13, ST14), the card payment transaction terminal 30 in this aspect of performance sends back the ordinary time (for example, 2000.04.14) (ST18) unless the information of the illegal act is stored in the memory 31M (NO at ST16). On the other hand, the card payment transaction terminal 30 sends back the special time (modified time information) (ST17) if the information of the illegal act is stored in the memory 31M (YES at ST16).

Herein, the memory 31M is the nonvolatile memory which is incorporated in a clock circuit having a built-in battery (the clock included in the terminal body 30B). Accordingly, the terminal 30 can transmit information to the exterior (70) anytime and repeatedly.

That is, according to the system, the card payment transactions of customers in good faith can be easily executed even after the intruder mounted the skimmer and reassembled the terminal body 30B and after the transmission information to the effect of the performance of the illegal act was transmitted to the exterior (70). Further, according to the system, whether or not the card is a forged one can be reliably discriminated in the exterior (70). Moreover, according to the system, the information can be transmitted to the exterior without being noticed by the wrongdoer, and the wrongful alteration of temporal information, etc. by the wrongdoer can be prevented.

Meanwhile, the system can return (set) the content of the memory 31M to a specified value (for example, standard time) (ST42 in FIG. 6) as regards the time information once modified, in a case where a security card (for example, SRAM card) has been installed in a predetermined position in the terminal body 30B (YES at ST40) and where the security card has been discriminated a legal one (YES at ST41).

The modified time information as stated above is obtained by modifying the specified value. Such modified time information, however, may well be set beforehand. Thereafter, the standard time of the clock itself in the terminal body 30B is set (ST43). In this case, the time information is the content set in the memory 31M.

Here, upon receiving transmission information from the card payment transaction terminal 30 (YES at ST27 in FIG. 5), the external computer 70 stores the card information (ST28) in the transmission information table 74T being a nonvolatile memory.

The use of a card in the card payment transaction terminal 30 at this stage is a use in good faith. On this occasion of the use in good faith, in a case where a skimmer was mounted in the card payment transaction terminal 30 before, the skimmer in the card payment transaction terminal 30 skims the card information of the user in good faith.

Besides, upon receiving an inquiry from the card payment transaction terminal 30 (YES at ST20 in FIG. 5), the external computer 70 searches the transmission information table 74T and the handled card information table 74K being a nonvolatile memory (ST21). Also, in a case where card payment transaction information including the same card information as that of the handled card is stored, the external computer 70 cumulates (or puts N=N+1) the number of times N of inquiries about the handled card and stores the result of the cumulation in the handled card information table 74K (ST22).

Incidentally, the transmission information table 74T and the handled card information table 74K may well be unitarily formed. In this case, the system can be built up with saving the storage capacity of the memory (HDD 24).

The initial value of the handled card information table 74K is zero (that is, the handled card information is not stored) Accordingly, in a case where the handled card information is not stored in the handled card information table 74K (NO at ST23), the external computer 70 responds to the card payment transaction terminal 30 to the effect of permitting a card payment transaction which concerns the inquiry (ST25).

In contrast, in a case where the handled card is stored in the handled card information table 74K (YES at ST23) and where the number of times N of inquiries (for example, 2 times) about the card payment transaction using the card is discriminated equal to or larger than a preset number of times Ns (2 times) (YES at ST24), the external computer 70 responds to the card payment transaction terminal 30 to the effect of rejecting the card payment transaction which uses the card (ST26). That is, in a case where the illegal use of a forged card is highly suspected, the system can prohibit the use.

Further, even when the handled card information is stored in the handled card information table 74K (YES at ST23), the external computer 70 sends the permission response to the card payment transaction terminal 30 (ST25) on condition that the number of times N of inquiries (for example, one time) is smaller than the preset number of times Ns (for example, 2 times) (NO at ST24). That is, the system can secure the use or uses of the legal card one time or a plurality of times.

Besides, the external computer 70 is formed so as to be capable of outputting the handled card information stored in the handled card information table 74K. Concretely, the external computer 70 can output the handled card information as a displayed list on the indicator 76 (ST30), in the presence of an output request (YES at ST29), and it can print out the handled card information by the printer 77 (ST31), in the presence of a request.

In addition, the external computer 70 can be formed so as to be capable of outputting the transmission information stored in the transmission information table 74T. In this case, the system can suppose the likelihood of the use of the forged card before the illegal use thereof.

Incidentally, on the side of the card payment transaction terminal 30, the information of the illegal act as stored in the memory (31M) cannot be printed by the printer 36. The reason therefor is that the insider of the store itself is sometimes included in the group of skimming. Thus, secrecy is kept, and defense is made thorough.

In such an aspect of performance, when the card payment transaction terminal 30 detects that the terminal body 30B shown in FIG. 3 was opened (YES at ST10 in FIG. 4), it judges the likelihood of the mounting of a skimmer. Then, this terminal stores information of an illegal act that has been performed, in the nonvolatile memory 31M (ST11).

Subsequently, the card payment transaction terminal 30 transmits transmission information including the information stored in the memory 31M, to the external computer 70 (ST12). Therefore, the system can transmit the information to the exterior without being noticed, even in the case where the insider of the store coexists as one member of the group of wrongdoers.

Upon receiving the transmission information from the card payment transaction terminal 30 (YES at ST27 in FIG. 5), the external computer 70 stores the transmission information in the transmission information table 74T (ST28).

In a case where, after the storage of the transmission information, card payment transaction information has been received from the card payment transaction terminal 30 (YES at ST20), the external computer 70 stores card information concerning the received card payment transaction information, in the handled card information table 74K (ST22) as a handled card associated with the transmission information stored in the transmission information table 74T.

Since the transmission information table 74T and the handled card information table 74K are formed of the nonvolatile memories (HDD 74), the system is capable of accepting transmission information and finding out the illegal uses of forged cards anytime and repeatedly.

Incidentally, the transmission information table 74T and the handled card information table 74K can also be unitarily formed to save a memory capacity.

In a case where the external computer 70 has received from the card payment transaction terminal 30 an inquiry about card payment transaction information which includes the same card information as the handled card information stored in the handled card information table 74K (YES at ST20 in FIG. 5), it permits the card payment transaction (ST25) when the number of times N of inquiries is equal to or smaller than a preset number of times Ns. In contrast, the external computer 70 rejects the card payment transaction (ST26) when the number of times N of inquiries exceeds the preset number of times Ns.

Accordingly, the system can execute the card payment transactions of customers in good faith even after the mounting of the skimmer unlike the program destruction mode in the prior art, so that it can keep customer service. Further, the system permits the side of the external computer 70 to know the mounting of the skimmer, so that it is easy of taking the drastic measure of finding and arresting the wrongdoer and his/her group who mounted the skimmer.

Moreover, according to the system, when the preset number of times Ns is set at "one time" by way of example, only one time of card use by a customer in good faith is permitted after the mounting of the skimmer, and the uses of the same card at the second time, et seq. can be readily discriminated as the illegal uses of the forged card. Also, when the preset number of times Ns is set at "3 times" by way of example, the system can be operated so as to permit 3 times of card uses in good faith a day for a regular customer, and the applicability thereof can be expanded more.

Besides, according to the system, information of an illegal act that has been performed is stored in the memory (31M) as time information including a date or time which cannot exist ordinarily. Therefore, even after the transmission information to the effect of the performance of the illegal act was transmitted to the exterior (70), the card payment transactions of customers in good faith can be easily executed, and whether or not a card is a forged one can be reliably discriminated in the exterior (70). Also, according to the system, the information can be transmitted to the exterior without being noticed by the wrongdoer, and the wrongful alteration of information, etc. by the wrongdoer can be prevented.

In addition, according to the system, the time information which is the information of the illegal act is generated by modifying the standard time of a clock included in the terminal body 30B, and hence, the wrongdoer cannot meddle with the terminal. Therefore, the system can reliably prevent the skimming and is safer.

Further, the modified time of the clock in the terminal body 30B can be returned to a standard time in a case where a security card has been installed in a predetermined position in the terminal body 30B (YES at ST40, and YES at ST41 in FIG. 6). Accordingly, the security card may be kept in custody in, e. g., the factory of its manufacturer, so that the system is much safer. In other words, any person who does not possess the security card cannot recover the system.

Still further, the external computer 70 can output (as a display output or/and a print output) the handled card information stored in the handled card information table 74K, so that the system facilitates the deduction of a forged card.

Incidentally, the system can be so formed that the transmission information stored in the transmission information table 74T are indicated out or printed out in the form of a list by way of example. Accordingly, the system can suppose the forgery of a card based on the information and the likelihood of the use of the forged card before the illegal use thereof.

What is claimed is:

1. A card payment transaction system that transmits to an external computer, information of card payment transaction using card information read from an inserted card by a card payment transaction terminal and a password inputted to the terminal, and executes a card payment transaction after a permission of the external computer has been obtained, wherein the card payment transaction terminal is formed so that:

the terminal detects that a terminal body has been opened when the terminal body is opened, and information of an illegal act that has been performed is stored in a memory when the opening of the terminal body is detected; and transmission information that includes information stored in the memory is transmitted to an external device, and wherein the external computer is formed so that:

the transmission information received from the card payment transaction terminal is stored in a transmission information table, and thereafter the card information which relates to the card payment transaction information received from the card payment transaction terminal is stored in a handled card information table in relation to the transmission information stored in the transmission information table; and in a case where an inquiry about the card payment transaction information which includes the card information that is same as a handled card information stored in the handled card information table has been received from the card payment transaction terminal, an inquired card payment transaction is permitted when the number of times of the inquiry is equal to or less than a preset number of times, and the inquired card payment transaction is rejected when the number of times of the inquiry exceeds the preset number of times.

2. The card payment transaction system as defined in claim 1, wherein the external computer outputs the handled card information stored in the handled card information table.

3. The card payment transaction system as defined in claim 2, wherein the handled card information is outputted as at least one of a display output and a print output.

4. The card payment transaction system as defined in claim 1, wherein the external computer outputs the transmission information stored in the transmission information table.

5. The card payment transaction system as defined in claim 4, wherein the transmission information is outputted as at least one of a display output and a print output.

6. The card payment transaction system as defined in claim 1, wherein the memory of the card payment transaction terminal, and the transmission information table and the handled card information table of the external computer are nonvolatile memories.

7. The card payment transaction system as defined in claim 1, wherein the card payment transaction terminal comprises a sensor which detects that the terminal body has been opened.

* * * * *